(12) United States Patent
Zhang et al.

(10) Patent No.: US 12,379,702 B2
(45) Date of Patent: Aug. 5, 2025

(54) SAFETY PRODUCTION MANAGEMENT SYSTEM FOR POWER PLANT

(71) Applicant: HUANENG INFORMATION TECHNOLOGY CO., LTD., Shandong (CN)

(72) Inventors: Yang Zhang, Qingdao (CN); Huajun Li, Qingdao (CN); Yubao Wang, Qingdao (CN); Minnan Lu, Qingdao (CN); Jun Xiao, Qingdao (CN); Jiale Wu, Qingdao (CN); Ke Du, Qingdao (CN); Longbin Yang, Qingdao (CN)

(73) Assignee: HUANENG INFORMATION TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/766,641

(22) Filed: Jul. 8, 2024

(65) Prior Publication Data

US 2025/0036096 A1    Jan. 30, 2025

(30) Foreign Application Priority Data

Jul. 26, 2023    (CN) .......................... 202310920115.1

(51) Int. Cl.
*G05B 19/042*    (2006.01)
(52) U.S. Cl.
CPC ............... *G05B 19/0428* (2013.01); *G05B 2219/24024* (2013.01)
(58) Field of Classification Search
CPC ............... G05B 19/0428; G05B 2219/24024
See application file for complete search history.

(56) References Cited

U.S. PATENT DOCUMENTS

| 11,680,867 B2 * | 6/2023 | Papadimitriou .... G01M 5/0033 702/34 |
| 2021/0166580 A1 * | 6/2021 | Mazzi ................. G09B 19/003 |

(Continued)

FOREIGN PATENT DOCUMENTS

| CN | 104198902 A | 12/2014 |
| CN | 111626636 A | 9/2020 |

(Continued)

OTHER PUBLICATIONS

First Office Action in Chinese Application No. 202310920115.1 mailed on Aug. 29, 2023, 20 pages.

(Continued)

*Primary Examiner* — Robert E Fennema
*Assistant Examiner* — Yvonne Trang Follansbee
(74) *Attorney, Agent, or Firm* — Porus IP LLC

(57) ABSTRACT

The disclosure provides a safety production management system for a power plant, which belongs to the technical field of power systems, and includes a monitoring module used for real-time monitoring working state information of each electrical equipment and operating state information of workers in the power plant; a data analysis module used for analyzing the working state information and the operating state information obtained by the monitoring module; a production dispatching center module managing each electrical equipment and the workers based on analysis results of the data analysis module; a emergency management module used for receiving emergency management instruction sent by the production dispatching center module, and performing emergency closing or opening of each electrical equipment, reminding and standardizing behavior and operation of the workers.

3 Claims, 1 Drawing Sheet

(56) References Cited

U.S. PATENT DOCUMENTS

2021/0326901 A1* 10/2021 Daley .................... G06N 20/00
2024/0004373 A1*  1/2024 Kozakai ................. G16Y 40/20

FOREIGN PATENT DOCUMENTS

| | | | |
|---|---|---|---|
| CN | 111753705 | A | 10/2020 |
| CN | 111861156 | A | 10/2020 |
| CN | 113741368 | A | 12/2021 |
| CN | 113780751 | A | 12/2021 |
| CN | 114373245 | A | 4/2022 |
| CN | 114581810 | A | 6/2022 |
| CN | 115022598 | A | 9/2022 |
| CN | 115294726 | A | 11/2022 |
| KR | 102008472 | B1 | 8/2019 |

OTHER PUBLICATIONS

Notification to Grant Patent Right for Invention in Chinese Application No. 202310920115.1 mailed on Sep. 21, 2023, 7 pages.

Zhang, Chao et al., An Investigation of the Emergency Management Information System for the Fossil-Fuel Power Plants, Journal of Safety and Environment, 9(2): 137-142, 2009.

Zeng, Li et al., Safety Production Management and Control Integrated Platform System Architecture for Power Plant, Computer Applications and Software, 34(10): 163-168+208, 2017.

Zhu, Mingzeng, Research on Intelligent Monitoring and Warning System for Wearing Safety Helmets on Substation Sites, China New Technologies and Products, 2015, 3 pages.

Wang, Xin, Research and Engineering Design of Intelligent Power Plant Security System, Master's Degree Thesis of Guangxi University, 2020, 69 pages.

* cited by examiner

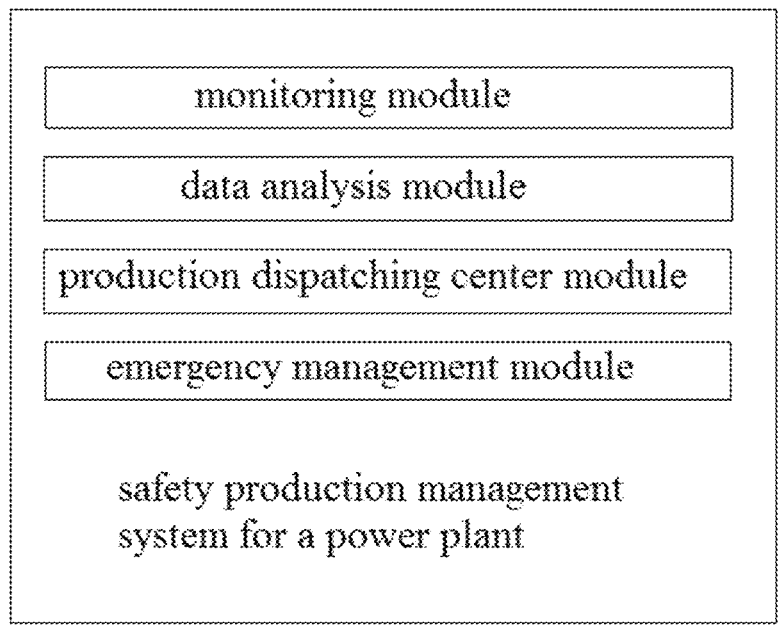

SAFETY PRODUCTION MANAGEMENT SYSTEM FOR POWER PLANT

CROSS-REFERENCE TO RELATED APPLICATIONS

This application claims priority of Chinese Patent Application No. 202310920115.1, filed on Jul. 26, 2023, the contents of which is hereby incorporated by reference.

TECHNICAL FIELD

The disclosure relates to the technical field of power systems, in particular to a safety production management system for a power plant.

BACKGROUND

The electric power industry is an important basic industry and public utility related to the national economy and people's livelihood, and it is an indispensable basic element of people's production and life. With the rapid development of industrialization and urbanization, the proportion of electricity in terminal energy consumption is increasing. The safe and stable operation of power system is of great significance to ensure the rapid development of economy and society.

Power system is an electric energy production and consumption system composed of power generating plant (power plants), power transmission and transformation lines, power supply and distribution stations and electricity consumption. Its function is to convert the primary energy in nature into electric energy through the power generation device, and then supply the electric energy to all users through power transmission, power transformation and power distribution. Among them, a power plant refers to a power plant that converts some form of primary energy into electrical energy for fixed facilities or transportation, such as thermal, hydraulic, steam, diesel or nuclear power plants.

At present, in the process of power production operation in power plant, workers in the plant often come into contact with high-voltage power equipment during daily inspection and maintenance. However, in most power plants, only the running state of equipment in the power plant is monitored, while the monitoring of workers' working behavior is neglected, which is prone to personal safety accidents, increasing the possibility of safety accidents in the process of power plant production operation, and the personal safety of workers during operation can not be fully guaranteed.

SUMMARY

The disclosure provides a safety production management system for a power plant, which simultaneously monitors both the equipment state and personnel state, the management of electrical equipment and operators is realized, and the operation behavior of the workers in the power plant are further supervised and regulated through emergency management instructions, thus the operation safety of electrical equipment and operators is ensured, and the safety operation level of the power plant is further improved.

The disclosure provides a safety production management system for a power plant, including a monitoring module, a data analysis module, a production dispatching center module and an emergency management module, where:

the monitoring module is used for real-time monitoring working state information of each electrical equipment and operating state information of workers in the power plant;

the data analysis module is used for analyzing the working state information and the operating state information obtained by the monitoring module;

the production dispatching center module manages each electrical equipment and the workers based on analysis results of the data analysis module;

the emergency management module is used for receiving emergency management instruction sent by the production dispatching center module, and based on the emergency management instruction performing emergency closing or opening of each electrical equipment, reminding and standardizing behavior and operation of the workers.

Preferably, the monitoring module includes:

equipment information code is used for calibrating equipment models of each electrical equipment and connection relationships among the electrical equipment, and connecting to the data analysis module;

a state sensor includes a current sensor, a voltage sensor and a temperature sensor, and is used for collecting current values, voltage values and temperature values of each electrical equipment and sending working state information such as the current values, the voltage values and the temperature values to the data analysis module;

positioning equipment are used for real-time positioning electrical equipment and personnel carrying a positioning device, and sending positioning information collected by the positioning device to the data analysis module.

Preferably, the monitoring module further includes:

a camera is used for real-time monitoring an equipment running state and an operation process of the workers in a preset area in the power plant, and generating corresponding video information;

a microphone is used for collecting sound information in the preset area in the power plant;

a hard disk storage system is used for storing the working state information obtained by the state sensor, the positioning information obtained by the positioning equipment, image information captured by the camera and the sound information obtained by the microphone.

Preferably, the data analysis module is used for analyzing various information data monitored by the monitoring module and generating corresponding analysis data information, and the production dispatching center module obtains the analysis data information and through a display screen to display;

based on the analysis data information, performing comparison with data in database, if a change range of data in the database is not satisfied, emergency state information is generated and is sent to a production dispatching center, and simultaneously corresponding emergency state information is displayed through the display screen of the production dispatching center.

Preferably, the emergency management module includes:

a personnel identification unit is used for obtaining personnel identity information of personnel entering an emergency management area, performing feature identification, and sending personnel access instruction when a feature identification result is qualified;

an access control unit, based on the personnel access instruction, broadcasting operation specification matters to the personnel entering the emergency management area through a loudspeaker, and simultaneously allowing the personnel to enter the emergency management area;

based on the emergency management instructions, announcing safety equipment to be worn to entry personnel and guiding the entry personnel into a preset dress changing area;

a dress selection unit, obtaining quantity information, category information and position information of usable safety equipment in the preset dress changing area, and screening first safety equipment satisfying physical conditions of the entry personnel based on the personnel identity information obtained by the personnel identification unit;

the dress selection unit is further used for displaying a state indicator light at a corresponding position of selected safety equipment as green and guiding the entry personnel to take, after receiving selection instruction input by the entry personnel based on a touch screen;

a wearing inspection unit is used for receiving real-time wearing state information after the entry personnel wearing taken safety equipment, and judging whether the entry personnel correctly wears the safety equipment as required by judging whether the entry personnel satisfies wearing qualification conditions, where the wearing qualification conditions include: an optical sensor monitors whether a light beam intensity value of the entry personnel after wearing the safety equipment is within a preset light beam variation range; a pressure sensor monitors whether a pressure value of the entry personnel after wearing the safety equipment is within a preset pressure change range;

a verification unit is used for obtaining judgment results of the wearing inspection unit, and verifying a state of the entry personnel wearing the safety equipment to generate equipment wearing verification information; simultaneously verifying quantity information and category information of unused safety equipment in the preset dress changing area, and generating unused equipment verification information, the emergency management module obtains the equipment wearing verification information and the unused equipment verification information; comparing the judgment results of the wearing inspection unit with the equipment wearing verification information, and after a comparison result conforms to a comparison judgment of a preset comparison information table, allowing personnel wearing corresponding safety equipment to enter a safe production operation area;

Preferably, the dress selection unit includes:

a detection subunit is used for rotating and shooting safety equipment placed in a storage cabinet in the preset dress changing area according to every 10 degrees, and constructing and obtaining a three-dimensional structure of the corresponding safety equipment;

a comparison subunit is used for judging that safety equipment corresponding to the storage cabinet is normal use equipment when the three-dimensional structure is completely consistent with a standard structure;

otherwise, a difference structure is extracted according to the three-dimensional structure and the standard structure, and difference feasibility of the difference structure is analyzed;

$$X1 = e^{-\left(\sum \frac{\left(\sqrt{(s0_{i1}-s1_{i1})^2}\right)_{\delta_{i1}>\delta_0}}{n2 \times S2} + \ln\left(1+\frac{n2}{n1}\right)\right)};$$

where X1 represents the difference feasibility; n2 represents a number of difference pairs satisfying $\sqrt{(s0_{i1}-s1_{i1})^2} > s2$ in a corresponding difference structure; n1 represents a total number of difference pairs of the corresponding difference structure; $s1_{i1}$ represents a difference position point in an i1th difference pair; $s0_{i1}$ represents a standard position point in the i1th difference pair; $\delta_{i1}$ represents a position weight of the i1th difference pair; $\delta_0$ represents a preset comparison weight; ln represents a sign of logarithmic function; s2 represents standard distance difference; e represents a sign of exponential function;

a judging subunit is used for judging the safety equipment corresponding to the storage cabinet being a first candidate equipment if the difference feasibility is less than a preset feasibility;

otherwise, a first position of the difference structure is initially locked to control ultrasonic wave detection equipment arranged in the storage cabinet to perform area detection on a corresponding first position, so as to obtain attenuation coefficients $a_{(i,j,k)}$ of each coordinate $(x_i, y_j, z_k)$ in a detection area corresponding to the first position, and a corresponding detection area is verified again:

$$a_{(i,j,k)} = \frac{|V_M - V_N| \times (1 - \varepsilon_1 - \varepsilon_2) - 20\lg\frac{n}{m}}{2(n-m) \times B_{(i,j,k)}}$$

where, $|V_m - V_n|$ is a decibel absolute difference of wave heights of low waves of m and n times, m and n are reflection times of the low waves, and $B_{(i,j,k)}$ is a thickness of a coordinate point $(x_i, y_j, z_k)$ in the detection area; $\varepsilon_1$ represents a polarization deviation factor of the ultrasonic wave detection equipment; $\varepsilon_2$ represents an influence deviation factor of causing an existence of ultrasonic wave detection based on detection environment; lg represents a sign of logarithmic function with base 10; $V_m$ represents a decibel of wave height of low wave of m-th time; $V_n$ represents a decibel of wave height of low wave of n-th time;

a statistical subunit is used for counting all attenuation coefficients of the corresponding detection area, and when they are all in an acceptable range, judging safety equipment of the corresponding storage cabinet as a second candidate equipment;

otherwise, judging the safety equipment of the corresponding storage cabinet is equipment to be replaced;

where the normal use equipment, the first candidate equipment and the second candidate equipment are the usable safety equipment, and equipment priority of the normal use equipment is higher than equipment priority of the first candidate equipment, and the equipment priority of the first candidate equipment is higher than equipment priority of the second candidate equipment.

Preferably, the wearing inspection unit includes:

a safety helmet detection subunit, where real-time data when the entry personnel wear a safety helmet is obtained through the optical sensor and the pressure sensor, where the optical sensor includes a transmitter and a receiver, and a position of a safety helmet lock tongue being inserted into a safety helmet lock catch is judged through an opposite transmit type optical detection mode between the transmitter and the receiver, and the safety helmet monitoring subunit analyzes position information;

the transmitter and the receiver are oppositely arranged in the safety helmet lock catch, and when the safety helmet lock tongue is not inserted into the safety helmet lock catch, the receiver is completely capable of detecting light beam emitted by the transmitter, and light beam intensity received by the receiver is a maximum light beam intensity value; when the safety helmet lock tongue is inserted into the safety helmet lock catch, the safety helmet lock tongue is located between the transmitter and the receiver and blocks the light beam emitted by the transmitter, the light beam intensity received by the receiver is reduced, and a switch signal is generated; the safety helmet detection subunit sends the switch signal to a wearing inspection module, and the wearing inspection module analyzes the switch signal;

where, the safety helmet lock tongue is provided with a plurality of counting holes of being passed by the light beam along moving direction, and is used for measuring a insertion depth of the safety helmet lock tongue when the safety helmet lock tongue is inserted into the safety helmet lock catch; when the safety helmet lock tongue is insert into the safety helmet lock catch, change of the light beam intensity value received by the receive generates a continuous signal waveform, the safety helmet detection subunit sends the signal waveform to the wearing inspection module, and the wear inspection module judges a insertion position of the safety helmet lock tongue by comparing with a preset signal waveform diagram, and sends a judgment result to the production dispatching center;

if the optical sensor monitors that the light beam intensity value between the transmitter and the receiver is within a variation range of a preset light beam intensity value when the safety helmet lock tongue being correctly inserted into the safety helmet lock catch, a safety helmet lock catch lock tongue locking signal is transmitted to the wearing inspection unit, a locking signal is processed by the wearing inspection unit and safety helmet fastening qualification information is generated, and the safety helmet fastening qualification information is obtained by the production dispatching center module and is displayed through the display screen;

if the optical sensor monitors the light beam intensity value between the transmitter and the receiver failing to satisfy the variation range of the preset light beam intensity value, the wearing inspection unit obtains light beam intensity data collected by the optical sensor, simultaneously generates safety helmet lock catch lock tongue unlocked information and safety helmet fastening unqualified information, and sends an alarm information to the production dispatching center module, and the production dispatching center displays the safety helmet fastening unqualified information and the alarm information through the display screen;

based on the safety helmet fastening unqualified information and the alarm information, the production dispatching center issues standard wearing instruction; based on personnel and equipment positioning information collected by the data analysis module, the emergency management module obtains the standard wearing instruction and reads the standard wearing instruction through a loudspeaker in a working area of a current safety helmet wearer being located;

meanwhile, the optical sensor continues to monitor the wearing state information of the wearer, the safety helmet detection subunit obtains real-time wearing information of the wearer and generates standardized wearing feedback information, comparative analysis with a safety helmet lock catch lock tongue unlocked signal and the safety helmet fastening unqualified information is performed, and the emergency management module obtains a comparative analysis result; if the wearer still standardized properly fails to wear the safety helmet, the production dispatching center module sends warning instruction to the emergency management module, and based on the positioning information the emergency management module reads irregular wearing behavior information of the wearer through the loudspeaker in the work area of the wearer of being located, and sends out a warning information.

Preferably, the wearing inspection unit further includes:

the pressure sensor real-time monitors pressure data between head and the safety helmet of the wearer, and the wearing inspection unit real-time obtains pressure data information monitored by the pressure sensor and analysis is performed; if the wearer wears the safety helmet correctly and fastens the safety helmet correctly, a pressure value obtained by the pressure sensor is within the preset pressure change range;

if posture of the wearer when wearing the safety helmet is incorrect or not properly fastened, the pressure value of the pressure sensor is not within a preset pressure change range, and based on a data analysis result generated by the wearing inspection unit, the production dispatching center module sends a wearing prompt information to the emergency management module, and the emergency management module broadcasts a wearing prompt instruction to the working area of the wearer being located through the loudspeaker after receiving the wearing prompt information, so as to prompt the wearer to wear the safety helmet correctly;

a plurality of pressure sensors are circumferentially arranged on a top of an inner side of the safety helmet and an inner side of a brim of the safety helmet, and pressure value data of each point position between the head and the safety helmet of the wearer are simultaneously monitored, and the wearing inspection unit comprehensively analyzes the pressure value data obtained by the plurality of pressure sensors to generate a comprehensive analysis result; if fluctuation range of the pressure value data monitored by the plurality of the pressure sensors exceeds fluctuation range of a preset pressure value within a preset time, the wearing inspection unit sends out a data abnormality signal;

based on the data abnormal signal, the production dispatching center module analyzes the data abnormal signal and calls positioning information of the wearer; a real-time emergency management module based on the positioning information determines the work area of the wearer, and meanwhile, the production dispatching center module obtains image information and audio information of area of the wearer of being located through the camera and the microphone, and displays real-time state information of the wearer through the display screen and the speaker.

Preferably, the wearing inspection unit further includes:

if the optical sensor monitors variation range of light beam intensity value before and after personnel wearing the safety equipment being within the preset light beam variation range, the wearing inspection unit judges the wearer satisfies a first wearing qualification condition;

if the pressure sensor monitors when the personnel wearing safety equipment, a fluctuation range of the pressure value between the personnel and the safety equipment is within the preset pressure change range, the wearing inspection unit judges the wearer satisfies a second wearing qualification condition;

based on the first wearing qualification condition and the second wearing qualification condition, the wearing inspection unit comprehensively analyzes above conditions to generate a comprehensive judgment result of equipment wearing qualification grade:

if the wearer satisfies both the first wearing qualification condition and the second wearing qualification condition when wearing the safety equipment, the wearer wearing the safety equipment correctly as required is judged, and wearing qualification grade is rated as grade A;

if the wearer only satisfies any one of the first wearing qualification condition or the second wearing qualification condition when wearing the safety equipment, the wearer not wearing the safety equipment as required specifications is judged, and wearing qualification grade is rated as grade B;

if the wearer fails to satisfy the first wearing qualification condition and the second wearing qualification condition simultaneously when wearing the safety equipment, the wearer failing to wear the safety equipment correctly as required is judged, and wearing qualification grade is rated as grade C;

the wearing inspection unit obtains the positioning information of the wearer and sends it to the production dispatching center module, and simultaneously displays the positioning information and wearing qualification grade of the wearer through a display screen; where, when the wearing qualification grade is grade B or grade C, the production dispatching center simultaneously sends the wearing qualification grade result, the positioning information and the alarm information of the wearer to the emergency management module, and the emergency management module determines the working area based on the positioning information of the wearer, and broadcasts the wearing prompt information to the wearer through the loudspeaker of the working area.

According to the disclosure, the monitoring module monitors the real-time working state of each electrical equipment in the power plant, and monitors the working information of workers who enter the power plant to work and the wearing information of workers wearing safety equipment in real time, thereby improving the standard level of workers wearing safety equipment, and further improving the protection effect of safety equipment on workers. At the same time, the usability state of the safety equipment is monitored, when the safety equipment is damaged or needs maintenance, the working condition of the safety equipment can be found through the dress selection unit, and the safety equipment can be repaired or replaced in time. When the safety equipment worn by the workers fails to conform to the corresponding wearing specifications, the irregular behavior of the workers can be found and reminded in time through the wearing inspection unit, which can not only improve the safety awareness of the workers, but also further improve the protection effect of the safety equipment on the workers.

Other features and advantages of the disclosure will be set forth in the description which follows, and in part will be obvious from the description, or may be learned by practice of the disclosure. The objects and other advantages of the disclosure may be realized and obtained by the structure particularly pointed out in the written specification and the appended drawings.

In the following, the technical scheme of the disclosure will be further described in detail through the attached drawings and embodiments.

BRIEF DESCRIPTION OF THE DRAWINGS

The accompanying drawings are provided to provide a further understanding of the disclosure and constitute a part of the specification. Together with the embodiments of the disclosure, they serve to explain the disclosure and do not constitute a limitation of the disclosure. In the attached drawings:

FIG. 1 is a structural diagram of a safety production management system for a power plant according to embodiments of the disclosure.

DETAILED DESCRIPTION OF THE EMBODIMENTS

Preferred embodiments of the disclosure will be described below with reference to the accompanying drawings. It should be understood that the preferred embodiments described here are only used to illustrate and explain the disclosure, and are not used to limit the disclosure.

The embodiments of the disclosure provide A safety production management system for a power plant, as shown in FIG. 1, including: a monitoring module, a data analysis module, a production dispatching center module and an emergency management module, where:

the monitoring module is used for real-time monitoring working state information of each electrical equipment and operating state information of workers in the power plant;

the data analysis module is used for analyzing the working state information and the operating state information obtained by the monitoring module;

the production dispatching center module manages each electrical equipment and the workers based on analysis results of the data analysis module;

the emergency management module is used for receiving emergency management instruction sent by the production dispatching center module, and based on the emergency management instruction performing emergency closing or opening of each electrical equipment, reminding and standardizing behavior and operation of the workers.

The monitoring module, which obtains various state information of electrical equipment or workers through various sensors or audio-visual monitoring equipment, such as operating parameters of electrical equipment such as working voltage, working current, working temperature, position information of workers in the factory and life feature information, so as to realize real-time monitoring of various working state information of electrical equipment or workers;

the data analysis module analyzes various data obtained by the monitoring module, such as: judging whether the electrical equipment is in normal operation and whether the workers are in normal operation;

the production dispatching center module is used for obtaining the judgment result of the data analysis module and displaying the corresponding judgment data, and sending corresponding control instructions to each electrical equipment and workers based on the analysis of the judgment result;

The emergency management module, when the working state of electrical equipment is abnormal or the working behavior of workers is not standardized, receives the corresponding emergency management instructions from the production dispatching center module, controls the switch of electrical equipment or reminds workers to carry out standardized operation, which not only improves the workers' awareness of standardized operation, but also improves the intelligent production level in the power plant.

The technical scheme has the following beneficial effects: the management of electrical equipment and operators is realized by monitoring both the equipment state and personnel state at the same time, and the operation behavior of workers in the power plant is further supervised and standardized through emergency management instructions, thus the operation safety of electrical equipment and operators is ensured, and the safe operation level of the power plant is further improved.

Further, the monitoring module includes:

equipment information code is used for calibrating equipment models of each electrical equipment and connection relationships among the electrical equipment, and connecting to the data analysis module;

a state sensor includes a current sensor, a voltage sensor and a temperature sensor, and is used for collecting current values, voltage values and temperature values of each electrical equipment and sending working state information such as the current values, the voltage values and the temperature values to the data analysis module;

positioning equipment are used for real-time positioning electrical equipment and personnel carrying a positioning device, and sending positioning information collected by the positioning device to the data analysis module.

The technical scheme has the following beneficial effects: through the equipment information code, the state sensor and the positioning equipment, the disclosure can monitor various parameters of each electrical equipment in the power plant in real time, thereby obtaining the real-time working state of each electrical device, and further improving the intelligent monitoring level of the power plant.

Further, the monitoring module further includes:

a camera is used for real-time monitoring an equipment running state and an operation process of the workers in a preset area in the power plant, and generating corresponding video information;

a microphone is used for collecting sound information in the preset area in the power plant;

a hard disk storage system is used for storing the working state information obtained by the state sensor, the positioning information obtained by the positioning equipment, image information captured by the camera and the sound information obtained by the microphone.

The technical scheme has the following beneficial effects: the video information of each area in the power plant can be captured by the camera, and the audio information of each area in the power plant can be captured by the microphone at the same time, which is equivalent to the fact that the power plant has eyes and cars at the same time, so that the monitoring level in the power plant can be greatly improved, and the sensor data, video information, audio information and other information obtained by the monitoring module can be backed up through the hard disk storage system for subsequent related personnel to check.

Further, the data analysis module is used for analyzing various information data monitored by the monitoring module and generating corresponding analysis data information, and the production dispatching center module obtains the analysis data information and through a display screen to display;

based on the analysis data information, performing comparison with data in database, if a change range of data in the database is not satisfied, emergency state information is generated and is sent to a production dispatching center, and simultaneously corresponding emergency state information is displayed through the display screen of the production dispatching center.

The technical scheme has the following beneficial effects: the data monitored by the monitoring module and the analysis data of the analysis module can be observed through the display screen of the production dispatching center; when electrical equipment fails or personnel are in distress, the production dispatching center can issue corresponding emergency management instructions, and then emergency operation in an emergency state can be realized through the emergency management module, so that the loss of electrical equipment can be reduced, a series of safety accidents can be prevented, and the safety monitoring level of the working state of workers can be improved.

Further, the emergency management module includes:

a personnel identification unit is used for obtaining personnel identity information of personnel entering an emergency management area, performing feature identification, and sending personnel access instruction when a feature identification result is qualified;

an access control unit, based on the personnel access instruction, broadcasting operation specification matters to the personnel entering the emergency management area through a loudspeaker, and simultaneously allowing the personnel to enter the emergency management area;

based on the emergency management instructions, announcing safety equipment to be worn to entry personnel and guiding the entry personnel into a preset dress changing area;

a dress selection unit, obtaining quantity information, category information and position information of usable safety equipment in the preset dress changing area, and screening first safety equipment satisfying physical conditions of the entry personnel based on the personnel identity information obtained by the personnel identification unit;

the dress selection unit is further used for displaying a state indicator light at a corresponding position of selected safety equipment as green and guiding the entry personnel to take, after receiving selection instruction input by the entry personnel based on a touch screen;

a wearing inspection unit is used for receiving real-time wearing state information after the entry personnel wearing taken safety equipment, and judging whether the entry personnel correctly wears the safety equipment as required by judging whether the entry personnel satisfies wearing qualification conditions, where the wearing qualification conditions include: an optical sensor monitors whether a light beam intensity value of the entry personnel after wearing the safety equipment is within a preset light beam variation range; a pressure sensor monitors whether a pressure value of the entry personnel after wearing the safety equipment is within a preset pressure change range;

a verification unit is used for obtaining judgment results of the wearing inspection unit, and verifying a state of the entry personnel wearing the safety equipment to generate equipment wearing verification information; simultaneously verifying quantity information and category information of unused safety equipment in the preset dress changing area, and generating unused equipment verification information, the emergency management module obtains the equipment wearing verification information and the unused equipment verification information; comparing the judgment results of the wearing inspection unit with the equipment wearing verification information, and after a comparison result conforms to a comparison judgment of a preset comparison information table, allowing personnel wearing corresponding safety equipment to enter a safe production operation area.

The technical scheme has the following beneficial effects: through the personnel identification unit and the access control unit, the possibility that idle people such as non-working people enter the power plant can be reduced, so that safety accidents caused by idle people mistakenly entering important places of the power plant can be reduced, and the safety production level of the power plant can be improved.

The dress selection unit can screen safety equipment suitable for workers wearing according to their height, weight, body shape and other feature information. At the same time, the wearing inspection unit can monitor the wearing state of workers, so that wearing unqualified workers cannot enter the working area, thus ensuring the best protective effect of safety equipment on workers as much as possible, and further improving the safety level of workers. The verification unit can realize "one person, one piece", realize the binding between safety equipment and users, make the use state and storage state of safety equipment transparent, and improve the monitoring accuracy of the wearing state of workers.

Further, the dress selection unit includes:

a detection subunit is used for rotating and shooting safety equipment placed in a storage cabinet in the preset dress changing area according to every 10 degrees, and constructing and obtaining a three-dimensional structure of the corresponding safety equipment;

a comparison subunit is used for judging that safety equipment corresponding to the storage cabinet is normal use equipment when the three-dimensional structure is completely consistent with a standard structure;

otherwise, a difference structure is extracted according to the three-dimensional structure and the standard structure, and difference feasibility of the difference structure is analyzed;

$$X1 = e^{-\left(\frac{\sum \left(\sqrt{(s0_{i1}-s1_{i1})^2}\right)_{\delta_{i1}>\delta_0}}{n2\times S2} + ln\left(1+\frac{n2}{n1}\right)\right)};$$

where X1 represents the difference feasibility; n2 represents a number of difference pairs satisfying $\sqrt{(s0_{i1}-s1_{i1})^2} > s2$ in a corresponding difference structure; n1 represents a total number of difference pairs of the corresponding difference structure; $s1_{i1}$ represents a difference position point in an i1th difference pair; $s0_{i1}$ represents a standard position point in the i1th difference pair; $\delta_{i1}$ represents a position weight of the i1th difference pair; $\delta_0$ represents a preset comparison weight; In represents a sign of logarithmic function; s2 represents standard distance difference; e represents a sign of exponential function;

a judging subunit is used for judging the safety equipment corresponding to the storage cabinet being a first candidate equipment if the difference feasibility is less than a preset feasibility;

otherwise, a first position of the difference structure is initially locked to control ultrasonic wave detection equipment arranged in the storage cabinet to perform area detection on a corresponding first position, so as to obtain attenuation coefficients $a_{(i,j,k)}$ of each coordinate $(x_i, y_j, z_k)$ in a detection area corresponding to the first position, and a corresponding detection area is verified again:

$$a_{(i,j,k)} = \frac{|V_M - V_N| \times (1 - \varepsilon_1 - \varepsilon_2) - 20\, lg\frac{n}{m}}{2(n-m) \times B_{(i,j,k)}}$$

where, $|V_m - V_n|$ is a decibel absolute difference of wave heights of low waves of m and n times, m and n are reflection times of the low waves, and $B_{(i,j,k)}$ is a thickness of a coordinate point $(x_i, y_j, z_k)$ in the detection area; $\varepsilon_1$ represents a polarization deviation factor of the ultrasonic wave detection equipment; $\varepsilon_2$ represents an influence deviation factor of causing an existence of ultrasonic wave detection based on detection environment; lg represents a sign of logarithmic function with base 10; $V_m$ represents a decibel of wave height of low wave of m-th time; $V_n$ represents a decibel of wave height of low wave of n-th time;

a statistical subunit is used for counting all attenuation coefficients of the corresponding detection area, and when they are all in an acceptable range, judging safety equipment of the corresponding storage cabinet as a second candidate equipment;

otherwise, judging the safety equipment of the corresponding storage cabinet is equipment to be replaced;

where the normal use equipment, the first candidate equipment and the second candidate equipment are the usable safety equipment, and equipment priority of the normal use equipment is higher than equipment priority of the first candidate equipment, and the equipment priority of the first candidate equipment is higher than equipment priority of the second candidate equipment.

In this embodiment, the normal use equipment are: safety equipment with perfect state and no defects.

In this embodiment, the first candidate equipment are: safety equipment with excellent condition, slightly worn appearance and normal protective performance.

In this embodiment, the second candidate equipment are: safety equipment with qualified state, serious appearance wear and deformation of structure, which does not affect the protection function.

In this embodiment, the equipment to be replaced are: safety equipment whose protection function is invalid and cannot continue to provide protection for the workers.

In this embodiment, the attenuation coefficient is: a parameter commonly used in ultrasonic wave flaw detection applications to evaluate the material structure.

In this embodiment, the detection area refers to a circular area divided by the radius a1 with the first position as the center point.

In this embodiment, the value range of $\varepsilon_1$ is [0, 0.06], and the value range of $\varepsilon_2$ is [0, 0.08].

The technical scheme has the following beneficial effects: the safety equipment is scanned in all directions by the detection subunit, so as to judge whether the appearance of safety equipment is deformed to affect its protective performance, if it is deformed, the deformed area is judged and the area is performed flaw detection by ultrasonic wave flaw detection technology, and whether the deformation affects its protective performance is judged through the analysis of flaw detection results. Through the above steps, the usable state of the safety equipment can be identified, so that the possibility of workers wearing safety equipment with ineffective protective function entering the working area is reduced, and the probability of workers being injured is further reduced.

Further, the wearing inspection unit includes:

a safety helmet detection subunit, where real-time data when the entry personnel wear a safety helmet is obtained through the optical sensor and the pressure sensor, where the optical sensor includes a transmitter and a receiver, and a position of a safety helmet lock tongue being inserted into a safety helmet lock catch is judged through an opposite transmit type optical detection mode between the transmitter and the receiver, and the safety helmet monitoring subunit analyzes position information;

the transmitter and the receiver are oppositely arranged in the safety helmet lock catch, and when the safety helmet lock tongue is not inserted into the safety helmet lock catch, the receiver is completely capable of detecting light beam emitted by the transmitter, and light beam intensity received by the receiver is a maximum light beam intensity value; when the safety helmet lock tongue is inserted into the safety helmet lock catch, the safety helmet lock tongue is located between the transmitter and the receiver and blocks the light beam emitted by the transmitter, the light beam intensity received by the receiver is reduced, and a switch signal is generated; the safety helmet detection subunit sends the switch signal to a wearing inspection module, and the wearing inspection module analyzes the switch signal;

where, the safety helmet lock tongue is provided with a plurality of counting holes of being passed by the light beam along moving direction, and is used for measuring a insertion depth of the safety helmet lock tongue when the safety helmet lock tongue is inserted into the safety helmet lock catch; when the safety helmet lock tongue is insert into the safety helmet lock catch, change of the light beam intensity value received by the receive generates a continuous signal waveform, the safety helmet detection subunit sends the signal waveform to the wearing inspection module, and the wear inspection module judges a insertion position of the safety helmet lock tongue by comparing with a preset signal waveform diagram, and sends a judgment result to the production dispatching center;

if the optical sensor monitors that the light beam intensity value between the transmitter and the receiver is within a variation range of a preset light beam intensity value when the safety helmet lock tongue being correctly inserted into the safety helmet lock catch, a safety helmet lock catch lock tongue locking signal is transmitted to the wearing inspection unit, a locking signal is processed by the wearing inspection unit and safety helmet fastening qualification information is generated, and the safety helmet fastening qualification information is obtained by the production dispatching center module and is displayed through the display screen;

if the optical sensor monitors the light beam intensity value between the transmitter and the receiver failing to satisfy the variation range of the preset light beam intensity value, the wearing inspection unit obtains light beam intensity data collected by the optical sensor, simultaneously generates safety helmet lock catch lock tongue unlocked information and safety helmet fastening unqualified information, and sends an alarm information to the production dispatching center module, and the production dispatching center displays the safety helmet fastening unqualified information and the alarm information through the display screen;

based on the safety helmet fastening unqualified information and the alarm information, the production dispatching center issues standard wearing instruction; based on personnel and equipment positioning information collected by the data analysis module, the emergency management module obtains the standard wearing instruction and reads the standard wearing instruction through a loudspeaker in a working area of a current safety helmet wearer being located;

meanwhile, the optical sensor continues to monitor the wearing state information of the wearer, the safety helmet detection subunit obtains real-time wearing information of the wearer and generates standardized wearing feedback information, comparative analysis with a safety helmet lock catch lock tongue unlocked signal and the safety helmet fastening unqualified information is performed, and the emergency management module obtains a comparative analysis result; if the wearer still standardized properly fails to wear the safety helmet, the production dispatching center module sends warning instruction to the emergency management module, and based on the positioning information the emergency management module reads irregular wearing behavior information of the wearer through the loudspeaker in the work area of the wearer of being located, and sends out a warning information.

The technical scheme has the following beneficial effects: the optical sensor arranged in the safety helmet monitoring subunit can monitor the real-time state of workers wearing safety helmets, so as to judge whether the workers correctly insert the lock tongue into the lock catch and the insertion depth of the lock tongue, and whether the workers wear safety helmets in a standardized manner is judged based on the comprehensive analysis of the above two data. If the workers do not wear safety helmets in a standardized manner, they can be reminded to wear safety helmets as required through the loudspeaker according to the positioning information, which can not only improve the safety awareness of the workers, but also improve the management level of the power plant for the workers to wear safety helmets in a standardized manner.

Further, the wearing inspection unit further includes:

the pressure sensor real-time monitors pressure data between head and the safety helmet of the wearer, and the wearing inspection unit real-time obtains pressure data information monitored by the pressure sensor and analysis is performed; if the wearer wears the safety helmet correctly and fastens the safety helmet correctly, a pressure value obtained by the pressure sensor is within the preset pressure change range;

if posture of the wearer when wearing the safety helmet is incorrect or not properly fastened, the pressure value of the pressure sensor is not within a preset pressure change range, and based on a data analysis result generated by the wearing inspection unit, the production dispatching center module sends a wearing prompt information to the emergency management module, and the emergency management module broadcasts a wearing prompt instruction to the working area of the wearer being located through the loudspeaker after receiving the wearing prompt information, so as to prompt the wearer to wear the safety helmet correctly;

a plurality of pressure sensors are circumferentially arranged on a top of an inner side of the safety helmet and an inner side of a brim of the safety helmet, and pressure value data of each point position between the head and the safety helmet of the wearer are simultaneously monitored, and the wearing inspection unit comprehensively analyzes the pressure value data obtained by the plurality of pressure sensors to generate a comprehensive analysis result; if fluctuation range of the pressure value data monitored by the plurality of the pressure sensors exceeds fluctuation range of a preset pressure value within a preset time, the wearing inspection unit sends out a data abnormality signal;

based on the data abnormal signal, the production dispatching center module analyzes the data abnormal signal and calls positioning information of the wearer; a real-time emergency management module based on the positioning information determines the work area of the wearer, and meanwhile, the production dispatching center module obtains image information and audio information of area of the wearer of being located through the camera and the microphone, and displays real-time state information of the wearer through the display screen and the speaker.

if the optical sensor monitors variation range of light beam intensity value before and after personnel wearing the safety equipment being within the preset light beam variation range, the wearing inspection unit judges the wearer satisfies a first wearing qualification condition;

if the pressure sensor monitors when the personnel wearing safety equipment, a fluctuation range of the pressure value between the personnel and the safety equipment is within the preset pressure change range, the wearing inspection unit judges the wearer satisfies a second wearing qualification condition;

based on the first wearing qualification condition and the second wearing qualification condition, the wearing inspection unit comprehensively analyzes above conditions to generate a comprehensive judgment result of equipment wearing qualification grade:

if the wearer satisfies both the first wearing qualification condition and the second wearing qualification condition when wearing the safety equipment, the wearer wearing the safety equipment correctly as required is judged, and wearing qualification grade is rated as grade A;

if the wearer only satisfies any one of the first wearing qualification condition or the second wearing qualification condition when wearing the safety equipment, the wearer not wearing the safety equipment as required specifications is judged, and wearing qualification grade is rated as grade B;

if the wearer fails to satisfy the first wearing qualification condition and the second wearing qualification condition simultaneously when wearing the safety equipment, the wearer failing to wear the safety equipment correctly as required is judged, and wearing qualification grade is rated as grade C;

the wearing inspection unit obtains the positioning information of the wearer and sends it to the production dispatching center module, and simultaneously displays the positioning information and wearing qualification grade of the wearer through a display screen; where, when the wearing qualification grade is grade B or grade C, the production dispatching center simultaneously sends the wearing qualification grade result, the positioning information and the alarm information of the wearer to the emergency management module, and the emergency management module determines the working area based on the positioning information of the wearer, and broadcasts the wearing prompt information to the wearer through the loudspeaker of the working area.

The technical scheme has the following beneficial effects: through the comprehensive analysis of the information obtained by the optical sensor and the pressure sensor, the situation of false detection and missed detection of safety helmet wearing is reduced, and the detection accuracy of wearing inspection unit on the safety helmet wearing of workers is improved. At the same time, when the worker falls or collides with other objects, the real-time pressure data between the worker and the safety helmet is monitored by the pressure sensor, so that the position of the worker can be located in time through the positioning information, and the image information of the position can be called to rescue the worker in time, thus improving the safety guarantee level for the worker.

Apparently, those skilled in the art can make various modifications and variations to the disclosure without departing from spirit and scope of the disclosure. Thus, if these modifications and variations of the disclosure are within the scope of the claims of the disclosure and their equivalents, the disclosure is also intended to include these modifications and variations.

What is claimed is:

1. A safety production management system for a power plant, comprising a monitoring module, a production dispatching center module, an emergency management module, one or more processors; and a storage device storing one or more programs, wherein:

the monitoring module is used for real-time monitoring working state information of each electrical equipment and operating state information of workers in the power plant;

the one or more programs, when executed by the one or more processors, cause the one or more processors to perform operation comprising: analyzing the working state information and the operating state information obtained by the monitoring module;

the production dispatching center module manage each electrical equipment and the workers based on analysis results of the one or more processors;

the emergency management module is used for receiving emergency management instruction sent by the production dispatching center module, and based on the emergency management instruction performing emergency closing or opening of each electrical equipment, reminding and standardizing behavior and operation of the workers;

wherein, the emergency management module comprises:

a personnel identification unit is used for obtaining personnel identity information of personnel entering an emergency management area, performing feature identification, and sending personnel access instruction when a feature identification result is qualified;

an access control unit, based on the personnel access instruction, broadcasting operation specification matters to the personnel entering the emergency management area through a loudspeaker, and simultaneously allowing the personnel to enter the emergency management area;

based on the emergency management instructions, announcing safety equipment to be worn to entry personnel and guiding the entry personnel into a preset dress changing area;

a dress selection unit, obtaining quantity information, category information and position information of usable safety equipment in the preset dress changing area, and screening first safety equipment satisfying physical conditions of the entry personnel based on the personnel identity information obtained by the personnel identification unit;

the dress selection unit is further used for displaying a state indicator light at a corresponding position of selected safety equipment as green and guiding the entry personnel to take, after receiving selection instruction input by the entry personnel based on a touch screen;

a wearing inspection unit is used for receiving real-time wearing state information after the entry personnel wearing taken safety equipment, and judging whether the entry personnel correctly wears the safety equipment as required by judging whether the entry personnel satisfies wearing qualification conditions, wherein the wearing qualification conditions comprise: an optical sensor monitors whether a light beam intensity value of the entry personnel after wearing the safety equipment is within a preset light beam variation range; a pressure sensor monitors whether a pressure value of the entry personnel after wearing the safety equipment is within a preset pressure change range;

a verification unit is used for obtaining judgment results of the wearing inspection unit, and verifying a state of the entry personnel wearing the safety equipment to generate equipment wearing verification information; simultaneously verifying quantity information and category information of unused safety equipment in the preset dress changing area, and generating unused equipment verification information, the emergency management module obtains the equipment wearing verification information and the unused equipment verification information; comparing the judgment results of the wearing inspection unit with the equipment wearing verification information, and after a comparison result conforms to a comparison judgment of a preset comparison information table, allowing personnel wearing corresponding safety equipment to enter a safe production operation area;

wherein, the dress selection unit comprises:

a detection subunit is used for rotating and shooting safety equipment placed in a storage cabinet in the preset dress changing area according to every 10 degrees, and constructing and obtaining a three-dimensional structure of the corresponding safety equipment;

a comparison subunit is used for judging that safety equipment corresponding to the storage cabinet is normal use equipment when the three-dimensional structure is completely consistent with a standard structure;

otherwise, a difference structure is extracted according to the three-dimensional structure and the standard structure, and difference feasibility of the difference structure is analyzed;

$$X1 = e^{\left(\sum \frac{\left(\sqrt{(s0_{i1}-s1_{i1})^2}\right)_{\delta_{i1}>\delta_0}}{n2 \times S2} + ln\left(1+\frac{n2}{n1}\right)\right)};$$

wherein X1 represents the difference feasibility; n2 represents a number of difference pairs satisfying $\sqrt{(s0_{i1}-s1_{i1})^2} > s2$ in a corresponding difference structure; n1 represents a total number of difference pairs of the corresponding difference structure; $s1_{il}$ represents a difference position point in an i1th difference pair; $s0_{il}$ represents a standard position point in the i1th difference pair; $\delta_{i1}$ represents a position weight of the i1th difference pair; $\delta_0$ represents a preset comparison weight; ln represents a sign of logarithmic function; s2 represents standard distance difference; e represents a sign of exponential function;

a judging subunit is used for judging the safety equipment corresponding to the storage cabinet being a first candidate equipment if the difference feasibility is less than a preset feasibility;

otherwise, a first position of the difference structure is initially locked to control ultrasonic wave detection equipment arranged in the storage cabinet to perform area detection on a corresponding first position, so as to obtain attenuation coefficients $a_{(i,j,k)}$ of each coordinate $(x_j, y_j, z_k)$ in a detection area corresponding to the first position, and a corresponding detection area is verified again:

$$a_{(i,j,k)} = \frac{|V_M - V_N| \times (1-\varepsilon_1-\varepsilon_2) - 20\,lg\frac{n}{m}}{2(n-m) \times B_{(i,j,k)}}$$

wherein, $|V_m-V_n|$ is a decibel absolute difference of wave heights of low waves of m and n times, m and n are reflection times of the low waves, and $B_{(i,j,k)}$ is a thickness of a coordinate point $(x_j, y_j, z_k)$ in the detection area; $\varepsilon_1$ represents a polarization deviation factor of the ultrasonic wave detection equipment; $\varepsilon_2$ represents an influence deviation factor of causing an existence of ultrasonic wave detection based on detection environment; lg represents a sign of logarithmic function with base 10; $V_m$ represents a decibel of wave height of low wave of m-th time; $V_n$ represents a decibel of wave height of low wave of n-th time;

a statistical subunit is used for counting all attenuation coefficients of the corresponding detection area, and when they are all in an acceptable range, judging safety equipment of the corresponding storage cabinet as a second candidate equipment;

otherwise, judging the safety equipment of the corresponding storage cabinet is equipment to be replaced;

wherein the normal use equipment, the first candidate equipment and the second candidate equipment are the usable safety equipment, and equipment priority of the normal use equipment is higher than equipment priority of the first candidate equipment, and the equipment priority of the first candidate equipment is higher than equipment priority of the second candidate equipment, wherein the monitoring module comprises:

equipment information code is used for calibrating equipment models of each electrical equipment and connection relationships among the electrical equipment, and connecting to the one or more processors;

a state sensor comprises a current sensor, a voltage sensor and a temperature sensor, and is used for collecting current values, voltage values and temperature values of each electrical equipment and sending working state information such as the current values, the voltage values and the temperature values to the one or more processors;

positioning equipment are used for real-time positioning electrical equipment and personnel carrying a positioning device, and sending positioning information collected by the positioning device to the one or more processors, and wherein the monitoring module further comprises:

a camera is used for real-time monitoring an equipment running state and an operation process of the workers in a preset area in the power plant, and generating corresponding video information;

a microphone is used for collecting sound information in the preset area in the power plant;

a hard disk storage system is used for storing the working state information obtained by the state sensor, the positioning information obtained by the positioning equipment, image information captured by the camera and the sound information obtained by the microphone, wherein the one or more processors is used for analyzing various information data monitored by the monitoring module and generating corresponding analysis data information, and the production dispatching center module obtains the analysis data information and through a display screen to display;

based on the analysis data information, performing comparison with data in database, if a change range of data in the database is not satisfied, emergency state information is generated and is sent to a production dispatching center, and simultaneously corresponding emergency state information is displayed through the display screen of the production dispatching center, wherein the wearing inspection unit comprises:

a safety helmet detection subunit, wherein real-time data when the entry personnel wear a safety helmet is obtained through the optical sensor and the pressure sensor, wherein the optical sensor comprises a transmitter and a receiver, and a position of a safety helmet lock tongue being inserted into a safety helmet lock catch is judged through an opposite transmit type optical detection mode between the transmitter and the receiver, and the safety helmet monitoring subunit analyzes position information;

the transmitter and the receiver are oppositely arranged in the safety helmet lock catch, and when the safety helmet lock tongue is not inserted into the safety helmet lock catch, the receiver is completely capable of detecting light beam emitted by the transmitter, and light beam intensity received by the receiver is a maximum light beam intensity value; when the safety helmet lock tongue is inserted into the safety helmet lock catch, the safety helmet lock tongue is located between the transmitter and the receiver and blocks the light beam emitted by the transmitter, the light beam intensity received by the receiver is reduced, and a switch signal is generated; the safety helmet detection subunit sends the switch signal to a wearing inspection module, and the wearing inspection module analyzes the switch signal;

wherein, the safety helmet lock tongue is provided with a plurality of counting holes of being passed by the light beam along moving direction, and is used for measuring a insertion depth of the safety helmet lock tongue when the safety helmet lock tongue is inserted into the safety helmet lock catch;

when the safety helmet lock tongue is insert into the safety helmet lock catch, change of the light beam intensity value received by the receive generates a continuous signal waveform, the safety helmet detection subunit sends the signal waveform to the wearing inspection module, and the wear inspection module judges a insertion position of the safety helmet lock tongue by comparing with a preset signal waveform diagram, and sends a judgment result to the production dispatching center;

if the optical sensor monitors the light beam intensity value between the transmitter and the receiver being within a variation range of a preset light beam intensity value when the safety helmet lock tongue being correctly inserted into the safety helmet lock catch, a safety helmet lock catch lock tongue locking signal is transmitted to the wearing inspection unit, a locking signal is processed by the wearing inspection unit and safety helmet fastening qualification information is generated, and the safety helmet fastening qualification information is obtained by the production dispatching center module and is displayed through the display screen;

if the optical sensor monitors the light beam intensity value between the transmitter and the receiver failing to satisfy the variation range of the preset light beam intensity value, the wearing inspection unit obtains light beam intensity data collected by the optical sensor, simultaneously generates safety helmet lock catch lock tongue unlocked information and safety helmet fastening unqualified information, and sends an alarm information to the production dispatching center module, and the production dispatching center displays the safety helmet fastening unqualified information and the alarm information through the display screen;

based on the safety helmet fastening unqualified information and the alarm information, the production dispatching center issues standard wearing instruction; based on personnel and equipment positioning information collected by the one or more processors, the emergency management module obtains the standard wearing instruction and reads the standard wearing instruction through a loudspeaker in a working area of a current safety helmet wearer being located;

meanwhile, the optical sensor continues to monitor the wearing state information of the wearer, the safety helmet detection subunit obtains real-time wearing information of the wearer and generates standardized wearing feedback information, comparative analysis with a safety helmet lock catch lock tongue unlocked signal and the safety helmet fastening unqualified information is performed, and the emergency management module obtains a comparative analysis result; if the wearer still standardized properly fails to wear the safety helmet, the production dispatching center module sends warning instruction to the emergency management module, and based on the positioning information the emergency management module reads irregular wearing behavior information of the wearer through the loudspeaker in the work area of the wearer of being located, and sends out a warning information.

2. The safety production management system for a power plant according to claim 1, wherein the wearing inspection unit further comprises:

the pressure sensor real-time monitors pressure data between head and the safety helmet of the wearer, and the wearing inspection unit real-time obtains pressure data information monitored by the pressure sensor and analysis is performed; if the wearer wears the safety helmet correctly and fastens the safety helmet correctly, a pressure value obtained by the pressure sensor is within the preset pressure change range;

if posture of the wearer when wearing the safety helmet is incorrect or not properly fastened, the pressure value of the pressure sensor is not within a preset pressure change range, and based on a data analysis result generated by the wearing inspection unit, the production dispatching center module sends a wearing prompt information to the emergency management module, and the emergency management module broadcasts a wearing prompt instruction to the working area of the wearer being located through a loudspeaker after receiving the wearing prompt information, so as to prompt the wearer to wear the safety helmet correctly;

a plurality of pressure sensors are circumferentially arranged on a top of an inner side of the safety helmet and an inner side of a brim of the safety helmet, and pressure value data of each point position between the head and the safety helmet of the wearer are simultaneously monitored, and the wearing inspection unit comprehensively analyzes the pressure value data obtained by the plurality of pressure sensors to generate a comprehensive analysis result; if fluctuation range of the pressure value data monitored by the plurality of the pressure sensors exceeds fluctuation range of a preset pressure value within a preset time, the wearing inspection unit sends out a data abnormality signal; based on the data abnormal signal, the production dispatching center module analyzes the data abnormal signal and calls positioning information of the wearer; a real-time emergency management module based on the positioning information determines a work area of the wearer, and meanwhile, the production dispatching center module obtains image information and audio information of area of the wearer of being located through the camera and the microphone, and displays real-time state information of the wearer through the display screen and the speaker.

3. The safety production management system for a power plant according to claim 1, wherein the wearing inspection unit further comprises:

if the optical sensor monitors variation range of light beam intensity value before and after personnel wearing the safety equipment being within the preset light beam variation range, the wearing inspection unit judges the wearer satisfying a first wearing qualification condition;

if the pressure sensor monitors when the personnel wearing safety equipment, a fluctuation range of the pressure value between the personnel and the safety equipment is within the preset pressure change range, the wearing inspection unit judges the wearer satisfying a second wearing qualification condition;

based on the first wearing qualification condition and the second wearing qualification condition, the wearing inspection unit comprehensively analyzes above conditions to generate a comprehensive judgment result of equipment wearing qualification grade:

if the wearer satisfies both the first wearing qualification condition and the second wearing qualification condition when wearing the safety equipment, the wearer wearing the safety equipment correctly as required is judged, and wearing qualification grade is rated as grade A;

if the wearer only satisfies any one of the first wearing qualification condition or the second wearing qualification condition when wearing the safety equipment, the wearer not wearing the safety equipment as required specifications is judged, and wearing qualification grade is rated as grade B;

if the wearer fails to satisfy both the first wearing qualification condition and the second wearing qualification condition simultaneously when wearing the safety equipment, the wearer failing to wear the safety equipment correctly as required is judged, and wearing qualification grade is rated as grade C;

the wearing inspection unit obtains the positioning information of the wearer and sends to the production dispatching center module, and simultaneously displays the positioning information and wearing qualification grade of the wearer through a display screen; wherein, when the wearing qualification grade is the grade B or the grade C, the production dispatching center simultaneously sends the wearing qualification grade result, the positioning information and the alarm information of the wearer to the emergency management module, and the emergency management module determines a working area based on the positioning information of the wearer, and broadcasts the wearing prompt information to the wearer through a loudspeaker of the working area.

* * * * *